United States Patent Office 2,815,377
Patented Dec. 3, 1957

2,815,377

DI-GUANYL HYDRAZONES

Werner Meiser and Gerhard Domagk, Wuppertal-Elberfeld, Germany, assignors to Schenley Industries, Inc., New York, N. Y., a corporation of Delaware No Drawing. Application March 25, 1954,
Serial No. 418,768

Claims priority, application Germany March 30, 1953

2 Claims. (Cl. 260—564)

This invention relates to di-guanyl-hydrazones. The invention more particularly relates to and has as its object the production of di-guanyl-hydrazones of di-phenyl di-aldehydes or di-phenyl di-ketones which have been found to exhibit valuable therapeutic properties.

The new compounds, in accordance with the invention, have the general formula:

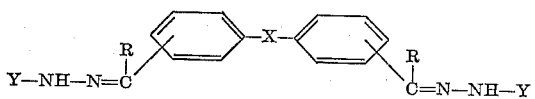

in which R is hydrogen or an alkyl radical; X is a direct linkage or a bridging member having up to about 12 atoms as, for example, oxygen, an $SO_2$ radical, i. e. a sulfonyl radical, an —O—R—O— radical in which R is an alkylene radical, sulfur, an imino radical, an alkyl radical which may, for example, contain hetero atoms such as oxygen, sulfur or imino radicals; and Y is a guanyl radical. The term "guanyl radical" is intended to include unsubstituted guanyl radicals and substituted guanyl radicals in which 1 to 3 of the hydrogen atoms are substituted with alkyl or aryl radicals. The term is also intended to include guanyl radicals in which the 2 nitrogen atoms are incorporated into a heterocyclic ring. In the formula, the phenyl nuclei may also be substituted. The

group may be at the 2, 3, 4, 5 or 6 position, i. e. the compounds may be ortho, meta or para compounds.

These new compounds have been found to exhibit an extremely high bactericidal activity and have been found particularly potent against a number of bacteria as, for example, streptococci, enterococci, pneumococci and staphylococci, so that the same are excellently suited as disinfectants for internal and external purposes. Due to their excellent compatibility, they are extremely well suited as oral disinfectants.

The new compounds, in accordance with the invention, may be prepared by a condensation reaction between an amino guanidine and a di-aldehyde or di-ketone of the general formula:

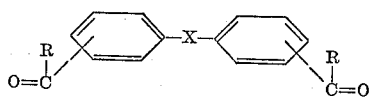

in which R and X are as described above.

The di-aldehydes and di-ketones employed in the condensation reaction may be prepared in various manners depending upon the nature of the bridging member X. Thus, for example, di-phenyl-4,4′-di-aldehyde, di-phenyl ether-4,4′-di-aldehyde, di-phenyl thio-ether 4,4′ di-aldehyde, 4,4′-di-aldehydo-di-phenyl sulfone and di-phenyl methane-4,4′-di-aldehyde may be obtained from the respective di-methyl compounds by oxidation or through the ω tetrabromo compounds as described in the literature.

Di-aldehydes and di-ketones containing methylene groups which are partially substituted by hetero atoms such as oxygen, sulfur or imino radicals are easily obtainable by condensing hydroxy benzaldehydes or hydroxy benzoketones or the corresponding thio- or amino-compounds with alkyl di-halides in the presence of alkali metal hydroxides. This reaction in connection with 4-hydroxybenzaldehyde and 1,3 dibromopropane may be represented as follows:

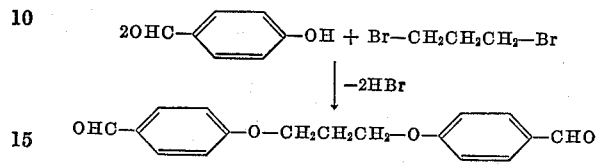

Two mols of the amino guanidine are condensed with a mol of the di-aldehyde or di-ketone. The amino guanidines may be unsubstituted or may be substituted in any manner provided that the hydrazino group remains intact. One to three hydrogen atoms of the amino guanidine which are not attached to the hydrazino group may be substituted by alkyl or aryl radicals. Thus, for example, alkyl, di-alkyl, tri-alkyl amino guanidines may be used. In addition, products containing alkyl groups which are interrupted by hetero atoms or carry further substituents may be used. The amino guanidines may also contain 2 nitrogen atoms of the guanidine configuration incorporated in a heterocyclic ring as, for example, 2-hydrazino-2-imidazoline of the formula:

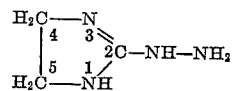

Or a 2-hydrazino-1,4,5,6-tetrahydropyrimidine of the formula:

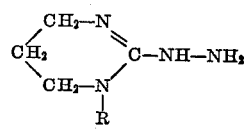

As examples of aromatic amino guanidines which may be used there may be mentioned mono-, di- and tri-arylamino guanidines containing a free hydrazino, i. e. —NH—$NH_2$ group as, for example, phenyl- or di-phenyl aminoguanidine. The phenyl nucleus of these amino-guanidines may carry further substituents. In addition, amino guanidines which are substituted by mixed aliphatic aromatic radicals such as N-ethyl-N-phenyl amino guanidine containing a free hydrazino group may be used. The aminoguanidine may also contain a heterocyclic substituent provided that the —NH—$NH_2$ remains intact.

These aminoguanidines are, for the most part, described in the literature or may easily be obtained according to conventional methods as, for example, by the reduction of nitro guanidines or by the reaction of iso-thiourea salts and hydrazine. These amino guanidines may also be obtained by reaction of S-alkylthiosemi-carbazide compounds and amines; by the addition reaction of hydrazine and cyanamides or by the desulfurization of thioureas in the presence of hydrazine.

For the reaction, 2 mols of the same or a different amino guanidine may be reacted with the di-ketone or di-aldehyde. The hydrazino group enters into a condensation reaction with the carbonyl group of the di-aldehydes or di-ketones splitting off water.

The condensation reaction is preferably effected in an alcoholic or aqueous alcoholic solution or in a mixture of water and a water soluble solvent such as dimethylformamide and dioxane. The reaction proceeds easily if the compounds are in the form of their salts.

The condensation is preferably effected in the presence of a small excess of acid though the same may also be performed in an alkaline medium.

An alternative method for the synthesis of the compounds, in accordance with the invention, consists of, first producing the corresponding thiosemicarbazones and, thereafter reacting these thiosemicarbazones with ammonia or amines in the presence of heavy metal salts. It is also possible to first produce the corresponding hydrazones and treat the same with cyanamides.

Alternatively, the new compounds may be produced by condensing aminoguanidines and benzaldehydes or benzoketones and linking 2 mols of the resulting guanylhydrazones with a bridging member if such is desired. Thus, for example, p-bromobenzaldehyde may be condensed with aminoguanidine to yield the guanylhydrazone of p-bromobenzaldehyde which may be converted into the di-guanyl hydrazone of p,p'-di-phenyl dialdehyde by nuclear linkage.

It is also possible to react the condensation products of p-hydroxybenzaldehyde and an aminoguanidine with a di-halogenoalkane such as a di-bromo alkane in the presence of an alkali metal hydroxide thus forming the new condensation products in accordance with the invention.

The salts of the new compounds with strong acids are, for the most part, difficultly soluble in cold water and relatively easily soluble in hot water. They readily yield free bases upon reaction with alkali metal hydroxides or with ammonia. The new compounds are colorless, finely crystallized compounds which yield readily soluble salts with organic acids, as, for example, acetic acid and lactic acid.

The following examples are given by way of illustration and not limitation:

Example 1

Fourteen and two tenths grams of p,p'-dialdehydo-1,3-diphenoxypropane (M. P. 126° C.; prepared from 4-hydroxybenzaldehyde and 1,3-dibromopropane in the presence of alkali) are dissolved in 380 cc. of warm alcohol and a solution of 11 grams of amino guanidine hydrochloride, 15 cc. of water and 5 cc. of concentrated hydrochloric acid is added. The solution is left standing at 60–80° C. for 2–3 hours whereupon crystallization begins. After cooling, the crystals of the dihydrochloride of the M. P. 240° C. are isolated. By dissolution in hot water and precipitation with ammonia, the 4,4'-diguanyl hydrazone of the above aldehyde is obtained as a base.

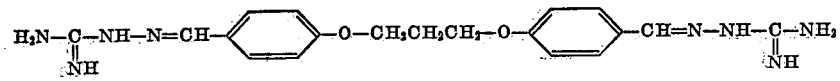

After boiling once for a short time with some acetic acid, the condensation product is obtained in the form of yellowish-white crystals, having a M. P. of 226° C. The compound has the following formula:

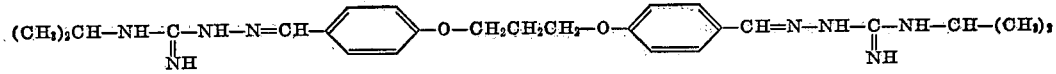

The condensation product can also be obtained from the bis-thiosemicarbazone of the above dialdehyde (decomposition point 220° C.) by reaction with ammonia and lead oxide in an alcoholic suspension.

Example 2

Thirty-one and two-tenths grams of p,p'-dialdehydo-1,5-diphenoxy pentane (M. P. 90° C.; prepared from p-hydroxy benzaldehyde and 1,5-dibromo-n-pentane in the presence of alkali) are dissolved in 250 cc. of warm alcohol and reacted with 22 grams of aminoguanidine hydrochloride in 25 cc. of water with the addition of 10 cc. of concentrated hydrochloric acid. After a violent reaction, the dihydrochloride having a M. P. of 226° C. begins to crystallize after standing for some time at a moderately raised temperature, as described in Example 1. The crystals are isolated and the base is prepared therefrom by dissolution in about 2.5 liters of warm water and precipitation with ammonia. By recrystallizing from dilute methanol the di-guanyl hydrazone of 4,4'-di-aldehyde-1,5-di-phenoxypentane is obtained in fine white crystals having a decomposition point of 240° C. The compound has the following formula:

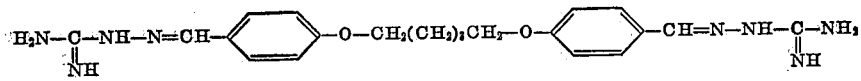

The same compound is obtained by dissolving 5.7 grams of p-hydroxybenzaldehyde guanyl hydrazone base (prepared according to Annalen 302, page 304) in 50 cc. of absolute alcohol, reacting the same with a solution of sodium ethoxide formed from 0.7 gram of sodium in 22 cc. of absolute alcohol and boiling with 3.5 grams of 1,5-dibromo-n-pentane for 48 hours. After pouring on ice water with the addition of some ammonia, the reaction product is recrystallized from methanol.

It is further possible to produce the same substance from the bis-thiosemicarbazone of p,p'-dialdehydo-1,5-diphenoxypentane (M. P. 210° C.) by reaction with ammonia and lead hydroxide in alcoholic suspension.

Example 3

Fourteen and two tenths grams of p,p'-dialdehydo-1,3-diphenoxy propane are dissolved in 380 cc. of warm alcohol and reacted with 19.7 grams of isopropyl-aminoguanidine-hydrobromide (M. P. 112° C.; prepared from S-ethylisopropyl-thiourea-hydrobromide and hydrazine) in 20 cc. of water with the addition of some concentrated nitric acid. After prolonged standing with gentle heating, the mixture is poured into 1.5 liter of water with the addition of some ammonia. The precipitated base is suction filtered, dissolved in ammonia and the dihydrochloride of the di-guanyl-isopropyl-hydrazone of the above di-aldehyde is precipitated with hydrochloric acid in the form of an oil. The salt crystallizes after decanting, washing with water and treating with ethyl acetate. The compound has the following formula:

Example 4

Fourteen and two tenths grams of p,p'-dialdehydo-1,3-diphenoxypropane are dissolved in 380 cc. of warm alcohol and reacted with 18.1 grams of 2-hydrazino-2-imidazoline hydrobromide (M. P. 186° C.; prepared from 2-ethylmercapto-2-imidazoline hydrobromide and hydrazine) in 18 cc. of water with the addition of 5 cc. of hydrobromic acid. After standing on the water bath for one hour, the di-hydrobromide crystallizes and is isolated; M. P. 302° C. By dissolution in water and treatment with ammonia and water, the di-imidazolino-hydrazone base of the above di-aldehyde is obtained; after recrystallizing from ethanol, the base is obtained in white crystals having a M. P. of 226° C. The compound has the following formula:

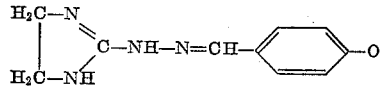

Example 5

Fifteen and six tenths grams of p,p'-dialdehydo-1,5-diphenoxypentane are dissolved in 100 cc. of warm alcohol and reacted with 18.1 grams of 2-hydrazino-2-imidazoline hydrobromide in 18 cc. of water with the addition of 5 cc. of hydrobromic acid. After standing for two hours, the mixture is filtered with gentle heating and allowed to crystallize. The dihydrobromide of the di-imidazolino-hydrazone of the above di-aldehyde is obtained which has a M. P. of 206° C. The base prepared therefrom melts at 232° C. after recrystallizing from dilute methanol. The compound has the following formula:

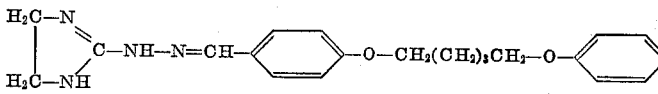

Example 6

Two and eighty four one hundredths grams of p,p'-dialdehydo-1,3-diphenoxy-propane are dissolved in 75 cc. of warm alcohol and reacted with 4.6 grams of phenyl-aminoguanidine hydrobromide ($N^1$ - amino - $N^3$-phenyl-guanidinehydrobromide) (M. P. 111° C.; prepared from S-ethyl - N - phenylisothiourea hydrobromide and hydrazine) in 10 cc. of water and 2 cc. of hydrobromic acid. After standing for two hours with gentle heating, the mixture is concentrated and cooled. The precipitated dihydrobromide is stirred with concentrated ammonia water and suction filtered. The base is precipitated once more from acetic acid solution with ammonia. The nearly insoluble base of the p,p'-diphenylguanylhydrazone of the above di-aldehyde crystallizes from ethyl acetate in yellowish crystals having a decomposition point of 230° C. The compound has the following formula:

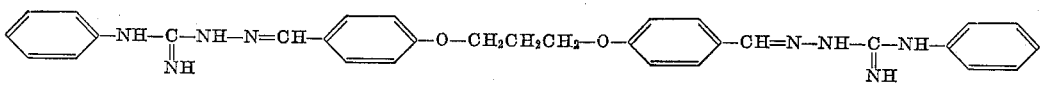

Example 7

Sixteen and three tenths grams of p,p'-dialdehydo-1,6-diphenoxyhexane are dissolved in 120 cc. of warm alcohol and reacted with 11.1 grams of aminoguanidine-hydrochloride in 11 cc. of water with the addition of 5 cc. of concentrated hydrochloric acid. The mixture is placed on a water bath and crystallization soon commences. After standing for two hours with gentle heating, the mixture is cooled and the dihydrochloride having a M. P. of 230° C. is isolated. The base of the di-guanyl-hydrazone of the above di-aldehyde is obtained therefrom in the usual manner and has a M. P. of 242° C. The compound has the following formula:

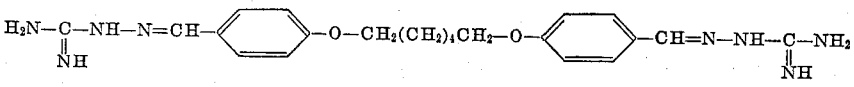

Example 8

Eleven and three tenths grams of diphenyl ether-4,4'-di-aldehyde (4,4'-diformyl di-phenyl oxide) (prepared from 4,4'-dimethyldi-phenyl-ether by tetrabromination and hydrolysis) in 100 cc. of alcohol are reacted with 11 grams of aminoguanidinehydrochloride in 11 cc. of water with the addition of 5 cc. of concentrated hydrochloric acid. After standing on a water bath for 3 hours, the mixture is evaporated in vacuo. The residue is dissolved in a larger quantity of water and precipitated with ammonia. After recrystallizing from methanol and water, the base of the di-guanyl-hydrazone of di-phenyl ether-4,4'-di-aldehyde is obtained in white crystals having a decomposition point of 257° C. The compound has the following formula:

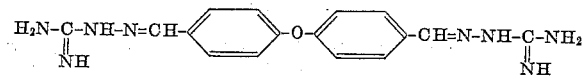

Example 9

Twenty one grams of di-phenyl-4,4'-di-aldehyde (4,4'-diformyl di-phenyl) (prepared from 4,4'-di-methyl di-phenyl by oxidation with chromic acid in a mixture of glacial acetic acid and acetic anhydride) are dissolved in 400 cc. of warm alcohol and reacted with 28 grams of aminoguanidine carbonate in 53 cc. of 4N-hydrochloric acid. After standing on the water bath for 3 hours and cooling the di-hydrochloride of the di-guanyl-hydrazone of di-phenyl-4,4'-di-aldehyde is suction filtered and washed. The compound has the following formula:

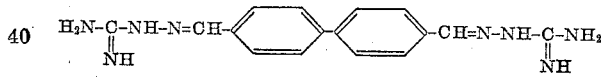

Example 10

Twenty seven and four tenths grams of 4,4'-di-aldehydo-di-phenylsulfone (prepared according to Beilstein, vol. 8, page 84) in 400 cc. of alcohol are reacted with 22 grams of aminoguanidinehydrochloride in water and some hydrochloric acid. After standing on a water bath for 3 hours, the di-hydrochloride of the di-guanylhydrazone begins to precipitate in colorless crystals. The compound has the following formula:

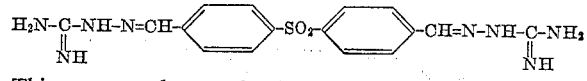

This compound may also be prepared from the bis-thiosemicarbazone of 4,4'-di-aldehydo di-phenylsulfone with alcoholic ammonia and lead hydroxide.

Example 11

Eighteen and four tenths grams of p,p'-di-propionyl-1,5-di-phenoxypentane (M. P. 110° C.; prepared from p-hydroxypropiophenone and 1,5-di-bromo-n-pentane) in 200 cc. of alcohol are reacted with 14 grams of aminoguanidine carbonate in 43 cc. of 2.44N-hydrochloric acid. After standing for a short time on a water bath, the alcohol is substantially evaporated and the residual solution is poured into about 1 liter of water with the addition of ammonia. After filtering and boiling with absolute alcohol, the base is obtained as white crystals having a M. P. of 220° C. Another quantity of this compound crystallizes from the alcohol. The compound has the following formula:

reaction sets in after the addition of 2 cc. of concentrated hydrochloric acid. The mixture is heated at 80° C. for three hours and the liquid portion is distilled off in vacuo. The residue is dissolved in hot water and precipitated with ammonia. After recrystallizing from about 2 liters of menthol the di-guanylhydrazone of 2,2'-di-aldehydo-1,4-di-phenoxybutane having a decomposition point of

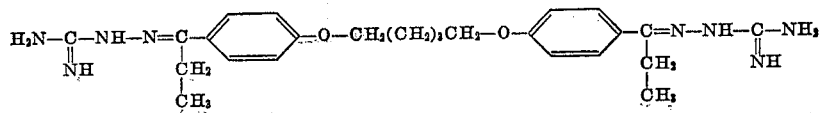

Example 12 p-Hydroxybenzaldehyde-di-methylguanyl-hydrazone (M. P. 300° C.; prepared from p-hydroxybenzaldehyde and $N^1$-amino-$N^3$-di-methyl guanidine hydrobromide, M. P. 212° C.) are suspended in 200 cc. of alcohol and reacted with a solution of sodium ethoxide formed from 1.93 grams of sodium in 60 cc. of alcohol. After addition of 4.8 grams of 1,5-di-bromo-n-pentane, the mixture is heated to a boil for 48 hours. After cooling, the mixture is poured into 1 liter of ice water and suction filtered. The di-methyl-guanylhydrazone of p,p'-di-aldehydo-1,5-diphenoxypentane is obtained as white crystals having a M. P. of 175° C. by recrystallizing from methanol and water. The compound has the following formula:

228° C. is obtained as white crystals. The compound has the following formula:

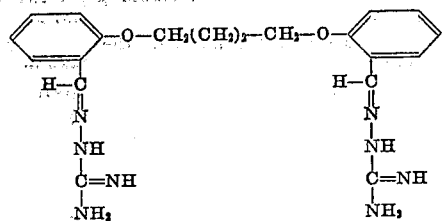

Example 15

Seven grams of m,m'-di-aldehydo-1,5-di-phenoxypentane (prepared from m-hydroxybenzaldehyde and 1,5-

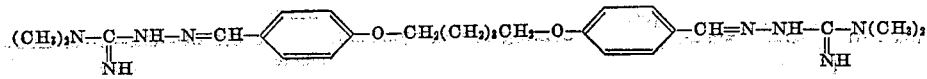

Example 13

Twenty five and eight tenths grams of o,o'-di-aldehydo-1,5-diphenoxypentane (melting point 79° C.; prepared from o-hydroxy benzaldehyde and 1,5-di-bromo-n-pentane in the presence of an alkali metal hydroxide) are dissolved in 160 cc. of warm alcohol and reacted with 18.2 grams of aminoguanidine hydrochloride in 18 cc. of water with the addition of 9 cc. of concentrated hydrochloric acid. After heating at about 80° C. for three hours, the mixture is distilled in vacuo. The residue is dissolved in about 1 liter of hot water and precipitated with ammonia. By recrystallizing from dilute alcohol, the di-guanylhydrazine of 2,2'-dialdehyde-1,5-di-phenoxypentane is obtained as white crystals having a melting point of 209° C. The compound has the following formula:

dibromo-n-pentane in the presence of an alkali metal hydroxide) are dissolved in 25 cc. of dry ethanol and reacted with 6 grams of amino-guanidine hydrochloride in 6 cc. of water with the addition of 2 cc. of concentrated hydrochloric acid. After heating at 70–80° C. for about 3 hours, the liquid portion is distilled off in vacuo. The residue is dissolved in hot water and precipitated with ammonia. By recrystallizing from dilute methanol, the di-guanylhydrazone of 3,3'-di-aldehydo-1,5-di-phenoxypentane having a melting point of 165° C. is obtained as white crystals. The compound has the following formula:

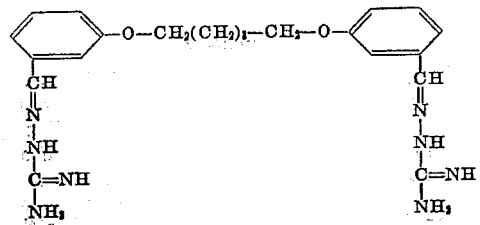

Example 16

Twenty four grams of p,p'-di-aldehydo-1,4-di-phenoxybutane (prepared from 4-hydroxybenzaldehyde and 1,4-dibromobutane in the presence of an alkali metal hydroxide) are dissolved in 400 cc. of warm alcohol and reacted with 18 grams of aminoguanidine hydrocholoride in 18 cc. of water with the addition of 2 cc. of concentrated hydrochloric acid. By heating at 70–80° C. for 3 hours, the dihydrochloride precipitates in fine crystals at elevated temperatures. After cooling, these crystals are dissolved in about 1.5 liters of hot water and the base is precipitated with ammonia. After boiling with methanol, the di-guanylhydrazone of 4,4'-di-aldehydo-1,4-phe-

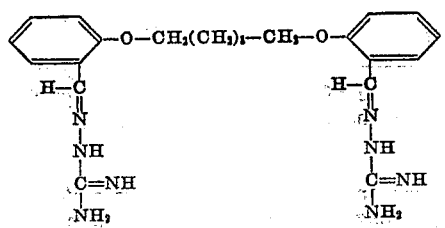

Example 14

Twenty three grams of o,o'-dialdehydo-1,4-di-phenoxybutane (melting point 117° C.; prepared from o-hydroxybenzaldehyde and 1,4-di-bromo-n-butane in the presence of an alkali metal hydroxide) are dissolved in 350 cc. of warm, dry ethanol and 17 grams of amino-guanidine chlorohydrate in 17 cc. of water are added. A noxybutane is obtained in white crystals of the decomposition point 255° C. The compound has the following formula:

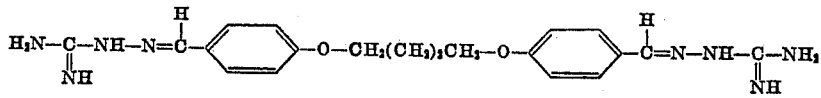

Example 17

Fourteen grams of p,p'-dialdehydo-1,3-di-phenoxypropanol (2) (prepared from p-hydroxybenzaldehyde and 1,3-dibromopropanol) are dissolved in 150 cc. of hot alcohol. After addition of 10.3 grams of aminoguanidine hydrochloride in 11 cc. of water and 5 cc. of concentrated hydrochloric acid, the mixture is kept at 70–80° C. for 3 hours whereupon the di-hydrochloride having a melting point of 250° C. crystallizes gradually. The base is obtained by dissolving the crystals in hot water and precipitating by addition of ammonia. By recrystallizing from dilute methanol, the di-guanylhydrazone of 4,4'-dialdehydo-1,3-di-phenoxypropanol(2) is obtained as white crystals having a melting point of 215° C. The compound has the following formula:

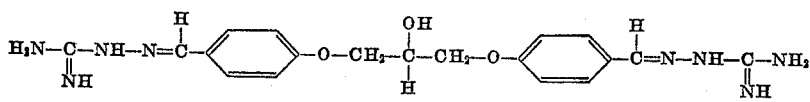

Example 18

Twenty-four grams of aminoguanidine hydrochloride, dissolved in 24 cc. of water with the addition of 8 cc. of concentrated hydrochloric acid, are added to an alcohol solution of the dialdehyde, prepared from 30.4 grams of vanillin and 1,5-dibromo-n-pentane in the presence of caustic alkali, and heated at 70–80° C. for three hours. After cooling, the di-hydrochloride is isolated and dissolved in a large quantity of hot water and the base precipitated with ammonia. By recrystallizing from dilute methanol, the di-guanylhydrazone of 4,4'-di-aldehydo-2,2'-di-methoxy-1,5'-di-phenoxypentane is obtained as white crystals having a melting point of 160° C. The compound has the following formula:

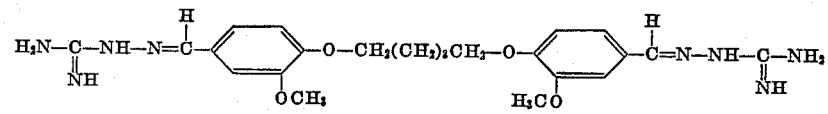

Example 19

Fifteen and seven-tenths grams of p,p'-di-aldehydo-2,2'-diphenoxy diethylether obtained from p-hydroxybenzaldehyde, β-β'-di-chloroethylether and sodium hydroxide solution are dissolved in 900 cc. of hot ethanol. Eleven grams of aminoguanidine chlorohydrate in 11 milliliters of water and 8 milliliters of concentrated hydrochloric acid are added. The mixture is concentrated to about 150 milliliters on the water bath. Upon cooling the di-hydrochloride separates. After recrystallizing from a mixture of methanol and ethanol, yellow crystals with a melting point of 187° C. are obtained. After dissolving in water and precipitation in ammonia, the bisguanylhydrazone of the p,p'-di-aldehydo-2,2'-di-phenoxydiethylether is obtained. The base is very difficultly soluble and is purified by boiling with ethanol into white crystals, decomposing at 229° C. The compound has the following formula:

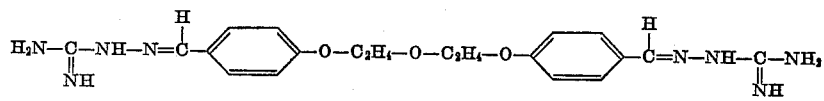

We claim:
1. As a new chemical compound, a di-guanyl hydrazone of a di-phenoxy di-alkyl ether di-aldehyde, in which the di-alkyl ether portion has from 2 to 12 carbon atoms.
2. As a new chemical compound, the bisguanylhydrazone of p,p'-di-aldehydo-2,2'-di-phenoxydiethylether.

References Cited in the file of this patent

UNITED STATES PATENTS

| | | |
|---|---|---|
| 2,425,223 | Barber | Aug. 5, 1947 |
| 2,584,784 | Biswell | Feb. 5, 1952 |

FOREIGN PATENTS

| | | |
|---|---|---|
| 575,145 | Great Britain | Feb. 5, 1946 |

OTHER REFERENCES

Ruzicka et al.: Helv. Chim. Acta., vol. 27, pp. 1561–9 (1944).